Dec. 10, 1935.  J. H. WILSON  2,023,828
DRUM OPERATING MECHANISM FOR WINCHES
Filed July 17, 1934   2 Sheets-Sheet 2
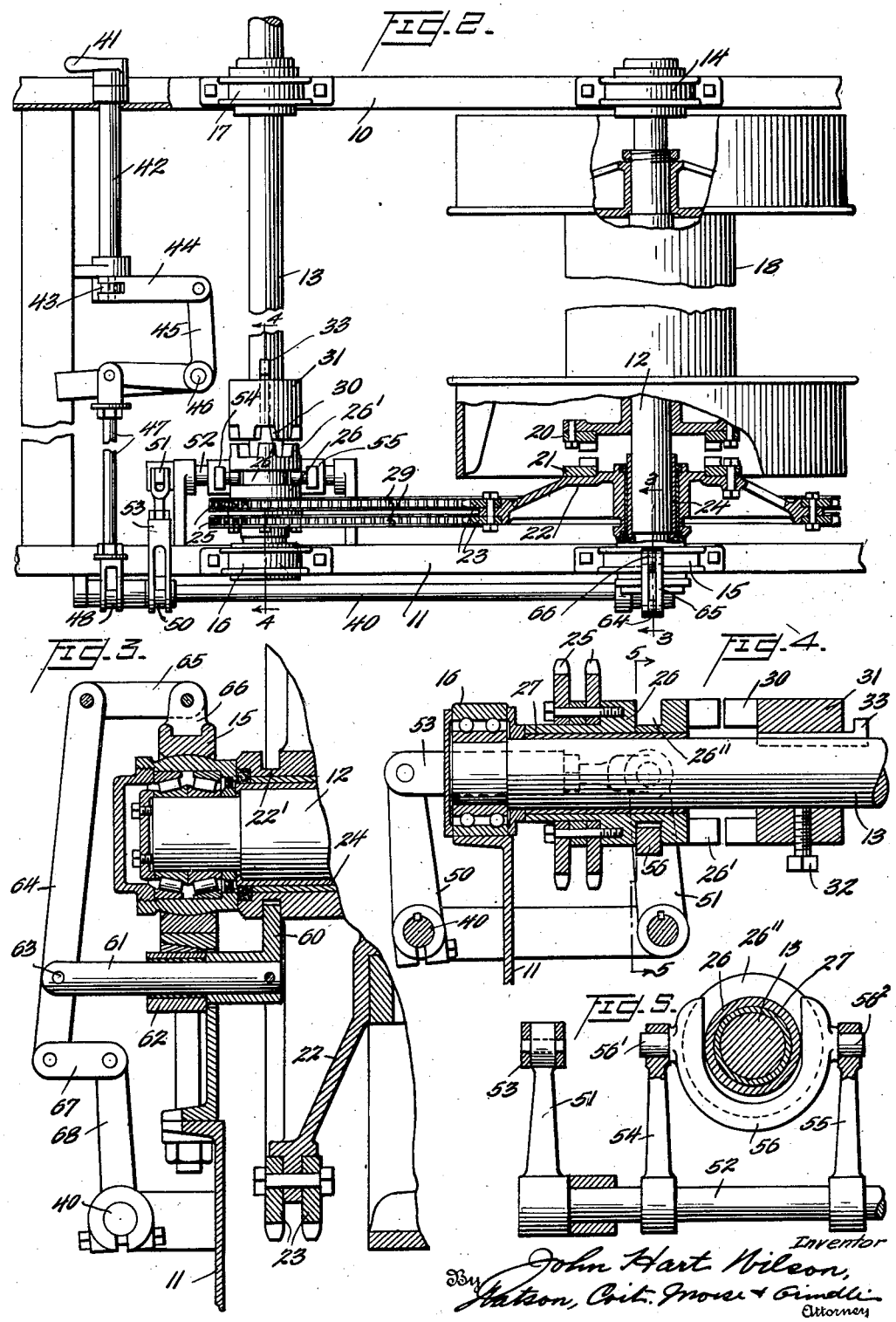

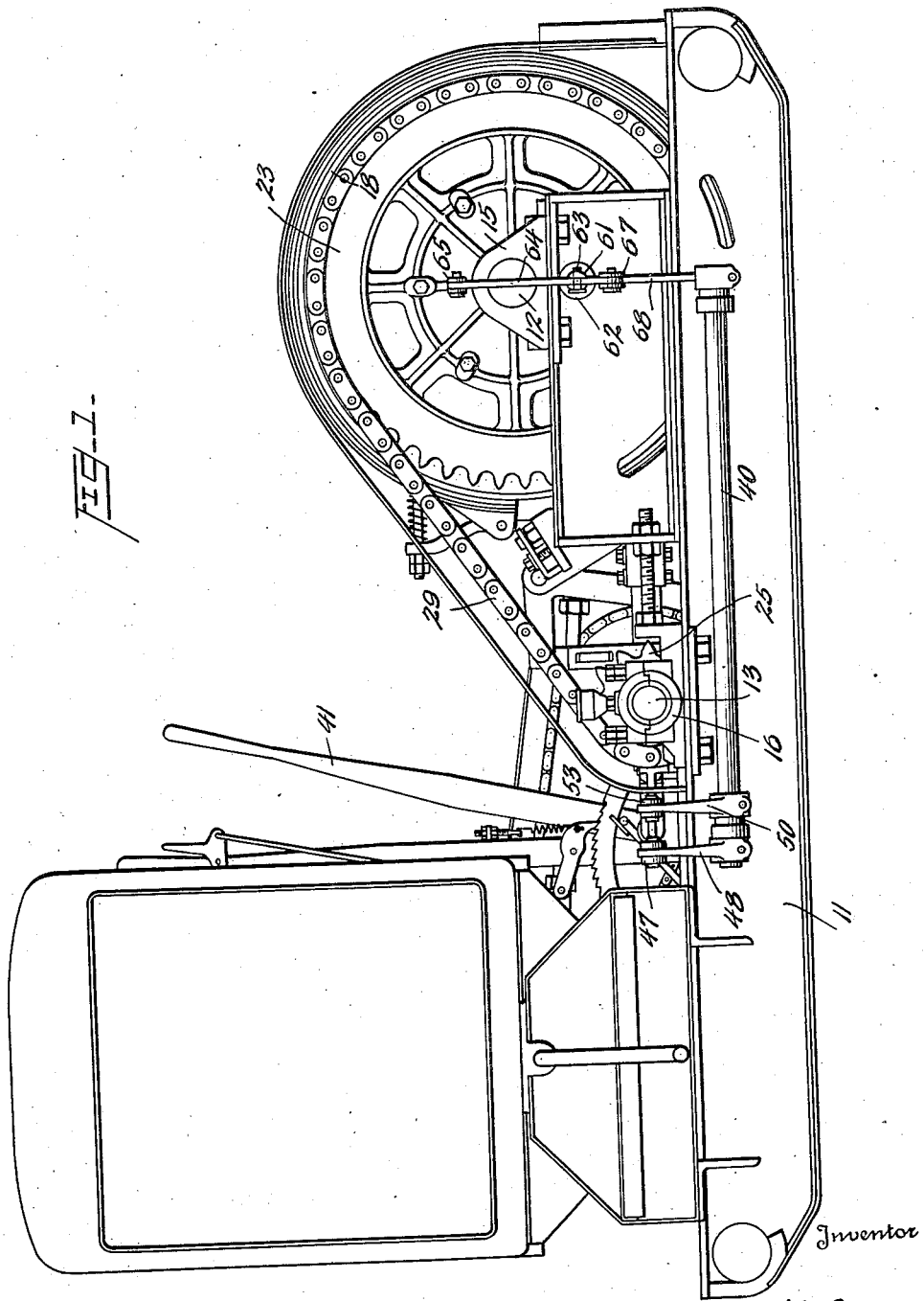

Patented Dec. 10, 1935

2,023,828

UNITED STATES PATENT OFFICE 2,023,828

DRUM OPERATING MECHANISM FOR WINCHES

John Hart Wilson, Wichita Falls, Tex.

Application July 17, 1934, Serial No. 735,660

4 Claims. (Cl. 254—187)

The present invention relates to drum operating mechanisms and particularly to mechanisms for operating the hoisting drums of winches of the type commonly employed in the oil fields in raising and lowering weld tubing, fishing tools, and other articles.

Hoisting drums and hoisting drum operating mechanisms of many kinds have been heretofore suggested, and numerous types of such mechanisms are employed in the oil fields, generally mounted upon mobile tractor units so that they may be moved from oil well to oil well. The drums may be and frequently are of large size, serving as rotatable cores for relatively great lengths of rope or cable. It is necessary that the driving means for such drums be of such character that the cable may be rapidly wound thereon, and it is also necessary that this driving mechanism be readily disconnectible from the drum in order that the drum may be rendered free to rotate about its axis to facilitate rapid unwinding of the rope or cable, the unwinding of the drum being controlled by means of a brake after disconnection of the driving mechanism. For the most part, drums of this nature have been rotatably mounted upon stationary shafts and driven from a power-operated drive shaft by means of chain and sprocket connections, one sprocket wheel being placed upon the drive shaft and a second sprocket wheel upon a stationary drum shaft, this last mentioned sprocket wheel being shiftable so that it may be clutched to or disengaged from the drum as desired by the operator, thus making or breaking the driving connection between the driving or counter shaft and the drum.

However, constructions of this last mentioned type have been seriously defective in certain respects, particularly in that disconnection of the sliding sprocket and drum has resulted in movement of the sliding sprocket out of the plane of the fixed sprocket on the drive shaft, thus moving the sprocket chain into a plane diagonal to the axes of the drive and drum shafts and increasing the wear upon the chain due to this misalignment of the sprockets, and the mechanism also being a hazard to the operator and to the oil well apparatus in connection with which it is being used by reason of the fact that the action of the misaligned chain constantly tends to return the sliding sprocket into clutching engagement with the drum, and such engagement may actually be brought about while the drum is rapidly unwinding, thus causing serious damage to the drum and possibly to the work being performed. While these disadvantages have been appreciated by those working with machines of this character, no satisfactory means for overcoming the difficulties has heretofore been devised. Where the hoisting mechanism is used in connection with oil field apparatus, it has been found impossible to employ friction clutches because of the possibility of oil being sprayed upon the apparatus and thus rendering the clutch inoperative.

In accordance with the present invention, a drum driving mechanism is provided by means of which the disadvantages of all prior constructions, either as suggested or actually used, are avoided, and a driving mechanism of light weight, low initial cost, and low cost of operation is provided which is at the same time mechanically correct in principle and offers no hazard to the operator.

Thus the improved hoisting mechanism contemplates the use of a driving mechanism which includes two sliding sprockets, one mounted upon the drum shaft and the other mounted upon the counter shaft, these sprockets being connected by the customary drive shaft, and means being provided whereby the operator may slide both sprockets axially on their respective shafts simultaneously and through equal distances in the same direction. The resulting mechanism insures that the drive chain lies at all times in the plane of the sprockets which it connects and hence that this chain at no time runs in a diagonal direction from sprocket to sprocket and at no time exerts a pull upon the sprocket at the end of the drum which tends to pull the sprocket toward the drum and accidentally cause clutching engagement while the drum may be unwinding.

The invention may be embodied in various types of apparatus, as will be apparent to one skilled in the art, and that form thereof which is set forth in the accompanying drawings is advanced by way of example only.

In the drawings:

Figure 1 is a side elevation of a hoisting mechanism of the type just briefly described applied to the frame of a winch of the type commonly used in and around oil fields;

Figure 2 is a top plan view of the same, partially broken away to more clearly show parts of the mechanism thereof;

Figure 3 is a section on line 3—3 of Figure 2;

Figure 4 is a section on line 4—4 of Figure 2; and

Figure 5 is a section on line 5—5 of Figure 4.

The side frame members of the winch are indicated at 10 and 11 respectively, the drum supporting shaft at 12, and the counter shaft or drive shaft at 13, the two shafts just mentioned having their axes in parallelism. The ends of the drum shaft are rotatably mounted in anti-friction bearings 14 and 15, preferably of the roller type, supported upon the side frame members, and the ends of the counter shaft 13 are rotatably mounted in bearings 16 and 17, preferably ball bearings, also supported by the side frame members.

The winding drum is indicated at 18, and this drum is fixed upon its supporting shaft 12 by any suitable means so as to rotate therewith. Upon one end of the drum is rigidly secured an annular element 20 of a jaw clutch, which element is adapted to be engaged with or disengaged from a corresponding element 21 fixed upon the inner side of a large disc 22 mounted upon shaft 12 for free rotation relatively thereto and carrying two sprockets 23. To prevent wear of the shaft and to insure ease of rotation of the sprocket on the shaft, a bushing 24 is positioned intermediate the shaft and hub of the sprocket. Two additional sprockets are indicated at 25, these sprockets being mounted upon a hub or sleeve 26 slidably and rotatably supported upon a cylindrical bushing 27 mounted upon the rotatable drive or counter shaft 13. The sprocket chains which connect sprockets 23 and 25 are indicated at 29. The pairs of sprockets 23 and 25 and the chains 29 are disposed, as shown in the drawings, in parallel vertical planes, and these planes are normal to the axes of the drum and drive shafts 12 and 13, respectively.

Upon its inner end the hub 26 is provided with a circular series of jaw teeth 26' which comprise clutch teeth, being adapted to mesh with corresponding teeth 30 upon the counter shaft. Sleeve 31 is held against movement axially of the shaft by means of a set screw 32 and is also fastened to the shaft 13 by key 33 so as to rotate therewith at all times. By sliding the sprocket hub 26 toward and away from the sleeve 31, the teeth 26' may be engaged with or disengaged from the teeth 30 of this sleeve and thus clutch the hub 26 to the shaft 13 or disconnect it from the shaft as desired. The clutch teeth 26' and 30 are somewhat longer than the teeth of inter-engaging clutch elements 20 and 21 for purposes to be hereinafter more fully explained.

Means is provided for shifting the sprockets and chains simultaneously in the same direction, thereby either engaging the two clutches or disengaging the same, and this sprocket and chain shifting mechanism will now be described.

Supported in suitable bearings upon the side frame member 11 and extending longitudinally of this member is a rock shaft 40. Rocking movement of this shaft may be effected by the manipulation of the operating lever 41, this lever being supported upon the end of a rock shaft 42 extending transversely of the machine and from a point adjacent the side frame member 10 to a point near the center of the machine. Upon the inner end of rock shaft 42 is fixed an upright lever 43, the upper end of which is connected by a link 44 with one arm of a bell crank lever 45 pivotally supported at 46 in any suitable manner. The other arm of the bell crank lever 45 is connected to a link or shift rod 47, the outer end of which is in turn pivotally connected to the upper end of a lever 48 fixed on shaft 40. When lever 42 is rocked in either direction by means of handle 41, therefore, its rocking motion is communicated through the link 44, bell crank lever 45, shift rod 47, and lever 48 to rock shaft 40, which may thus be rocked in either direction at the will of the operator.

Rock shaft 40 is in turn connected to both sprocket hubs 26 and 22 so that, when shaft 40 is rocked, these hubs are simultaneously and equally shifted. The connection between shaft 40 and sprocket hub 26 includes the vertical lever 50, the upper end of which is connected to the upper end of a generally similar lever 51 mounted upon a short rock shaft 52, the connection being made by means of adjustable link 53. Rock shaft 52 has in turn two additional levers 54 and 55 fixed thereon and projecting upwardly to points on opposite sides of the counter shaft 13 and sleeve 26. Sleeve 26 has formed therein an annular groove 26'', within which groove is positioned the shifter fork 56 provided with coaxial cylindrical trunnions 56' and 56² rotatably mounted in suitable apertures provided in the upper ends of levers 54 and 55, respectively. It is clear from this construction that rocking movement of shaft 40 communicates sliding movement to sleeve 26 and hence movement of sprockets 25 axially of shaft 13.

The hub upon which sprockets 23 are mounted is connected to the rock shaft 40 by means of a shifter fork 60 projecting within an annular groove 22' formed in this hub, and suitable linkage for converting the angular movement of the rock shaft into linear movement of the shifter fork. It will be seen that the shifter fork is mounted upon the end of a shifter shaft 61, which shaft is in turn slidably mounted in a stationary bearing member 62 welded to the frame of the machine. The outer end of shifter shaft 61 is pivotally connected at 63 to a lever 64, the upper end of which is pivotally connected by means of a link 65 to a stationary lug 66 formed upon the adjacent drum shaft bearing, and the lower end of this lever is connected by a link 67 to the upper end of a lever 68 fixed upon shaft 40.

From an inspection of Figure 3 of the drawings, it is clear that rocking movement of shaft 40 is converted by the system of levers and links just described into longitudinal movement of the shifter fork 60 along the axis of shifter shaft 61. The parts which effect the shifting of shifter fork 60 are so dimensioned throughout that the movement of shifter fork 60 is the same as the movement of shifter fork 56 associated with sprocket hub 26 for a given angular movement of rock shaft 40 so that, for all possible adjustments of these sprockets, they remain in the same plane. The sprocket chain, therefore, at no time extends diagonally from one sprocket to another but always maintains its correct theoretical position with respect to the sprockets. At no time is there applied by this chain any force to the sprocket 22 which tends to move this last mentioned sprocket from disengaged to engaged position. Hence the mechanism just described possesses none of the defects of devices of this general nature heretofore designed or suggested and at the same time has the advantage of ruggedness, durability, and low cost of installation and upkeep.

When the hubs 22 and 26 are moved from their disengaged positions (Figure 2) toward engaged positions, the teeth 26' will engage teeth 30 prior to the time when the teeth of clutch ring 21 will engage the teeth of clutch ring 20. The clutch ring 21 will be in motion, therefore, when its teeth interlock with those of clutch ring 20. This arrangement insures proper meshing of clutch rings 20 and 21 whenever the drum is to be driven.

Both clutches are disengaged when power is to be taken from the tractor to operate other machinery, and the drum, as well as the sprockets and chains, remains stationary.

Having thus described the invention, what is claimed as new and desired to be secured by Letters Patent is:

1. In a winch, in combination, a rope receiving drum of relatively large size, a shaft upon which said drum is fixed and anti-friction means for rotatably supporting said shaft, whereby the shaft and drum may revolve freely to permit high speed unwinding of a cable wound on the drum, and means for driving the drum in the opposite direction about its axis to effect winding of the cable thereon, said means including a rotatable power driven drive shaft the axis of which is parallel to the axis of the drum supporting shaft, sprocket members slidably mounted on said shafts, respectively, and disposed in a common plane transverse to the axes of the drum and power shafts, a chain connecting said members, means for simultaneously sliding said sprocket members axially of the shafts upon which they are mounted respectively, and jaw clutch members carried by the sprockets, drum, and power shaft, respectively, whereby the shaft and drum are positively connected when said sprockets are simultaneously moved in one direction and are disconnected when the sprockets are simultaneously moved in the opposite direction.

2. In a winch, in combination, a rope receiving drum of relatively large size, means rotatably supporting the drum for free high speed rotation in one direction about its axis to permit rapid unwinding of a cable coiled upon the same, and means for driving the drum in the reverse direction about its axis to effect winding of the cable thereon, said means including a rotatable drive shaft the axis of which is parallel to the axis of rotation of the drum, sprocket members coaxial with the drum and shaft, respectively, and disposed in a common plane transverse to the axes of the drum and shaft, a chain connecting said members, means for simultaneously sliding said sprocket members axially of the drum and shaft, respectively, and jaw clutch members carried by the sprockets, shaft, and drum, respectively, whereby the shaft and drum are positively connected when said sprockets are simultaneously moved in one direction and are disconnected when the sprockets are simultaneously moved in the opposite direction.

3. In a winch, in combination, a rope receiving drum of relatively large size, means rotatably supporting the drum for free high speed rotation in one direction about its axis to permit rapid unwinding of a cable coiled upon the same, and means for driving the drum in the reverse direction about its axis to effect winding of the cable thereon, said means including a rotatable drive shaft the axis of which is parallel to the axis of rotation of the drum, sprocket members coaxial with the drum and shaft, respectively, and disposed in a common plane transversely to the axes of the drum and shaft, a chain connecting said members, means for simultaneously sliding said sprocket members axially of the drum and shaft, respectively, and means associated with the sprockets, shaft, and drum, respectively, whereby the shaft and drum are positively connected when said sprockets are simultaneously moved in one direction and are disconnected when the sprockets are simultaneously moved in the opposite direction.

4. In a winch, in combination, a rope receiving drum of relatively large size, means rotatably supporting the drum for free high speed rotation in one direction about its axis to permit rapid unwinding of a cable coiled upon the same, and means for driving the drum in the reverse direction about its axis to effect winding of the cable thereon, said means including a rotatable drive shaft, the axis of which is parallel to the axis of rotation of the drum, sprocket members coaxial with the drum and shaft, respectively, and disposed in a common plane transverse to the axes of the drum and shaft, a chain connecting said members, means for simultaneously sliding said sprocket members axially of the drum and shaft, respectively, and means associated with the sprockets, shaft, and drum, respectively, whereby the shaft and drum are positively connected when said sprockets are simultaneously moved in one direction and are disconnected when the sprockets are simultaneously moved in the opposite direction, said last mentioned means including a jaw clutch member positively connected to the drum and a mating jaw clutch member positively connected to the associated sprocket.

JOHN HART WILSON.